United States Patent [19]
Chia et al.

[11] Patent Number: 5,094,030
[45] Date of Patent: Mar. 10, 1992

[54] APPARATUS FOR THE GROWING OF EDIBLE SPROUTS

[75] Inventors: Martin Chia; Frederick Troost, both of Winnipeg, Canada

[73] Assignee: Jeno F. Paulucci, Sanford, Fla.

[21] Appl. No.: 681,487

[22] Filed: Apr. 3, 1991

Related U.S. Application Data

[63] Continuation of Ser. No. 178,142, Apr. 6, 1988, abandoned.

[30] Foreign Application Priority Data

May 29, 1988 [CA] Canada ............................... 557679

[51] Int. Cl.⁵ .............................................. A01G 31/02
[52] U.S. Cl. ............................................... 47/61; 47/14
[58] Field of Search ............................... 47/59-65, 47/14, 82, 83

[56] References Cited

U.S. PATENT DOCUMENTS

| | | | |
|---|---|---|---|
| 836,993 | 11/1906 | Rahr et al. | 47/14 |
| 2,750,713 | 6/1956 | Chin | 47/14 |
| 2,810,988 | 10/1957 | Chin | 47/61 |
| 2,917,867 | 12/1959 | Bailey | 47/60 |
| 3,906,663 | 9/1975 | Ping et al. | 47/14 |
| 3,945,148 | 3/1976 | Oyama | 47/14 |
| 4,086,725 | 5/1978 | Li | 47/61 |
| 4,180,941 | 1/1980 | Korimatsu | 47/61 |
| 4,471,572 | 9/1984 | Young | 47/61 |
| 4,551,942 | 11/1985 | Brown | 47/59 |
| 4,729,188 | 3/1988 | Cheng | 47/59 |

FOREIGN PATENT DOCUMENTS

| | | | |
|---|---|---|---|
| 173494 | 7/1906 | Fed. Rep. of Germany | 47/14 |
| 2089632 | 6/1982 | United Kingdom | 47/61 |
| 87/04589 | 8/1987 | World Int. Prop. O. | 47/82 |

Primary Examiner—Danton D. DeMille
Attorney, Agent, or Firm—Willian Brinks Olds Hofer Gilson & Lione

[57] ABSTRACT

Apparatus for the growing of sprouts includes a variable volume expandable chamber for containing a mass of the growing sprouts. Means for restraining expansion of the chamber as the sprouts grow and expand are provided to thereby cause compressive forces to develop in the mass of growing sprouts to promote generally thick, short sprout growth. The apparatus also includes means for fully immersing the compressed sprouts periodically for selected intervals of time in water to supply moisture to the sprouts and prevent overheating of same.

4 Claims, 5 Drawing Sheets

APPARATUS FOR THE GROWING OF EDIBLE SPROUTS

This application is a continuation, of application Ser. No. 07/178,142, filed Apr. 6, 1988 now abandoned.

BACKGROUND OF THE INVENTION

This invention relates to the intensive cultivation and growing of vegetable matter, especially bean sprouts, in apparatus providing a controlled environment.

The prior art has provided intensive cultivation apparatus including a cabinet equipped with several growth chambers or bins for growing sprouts or the like. The cabinet is provided with spray heads and control means therefor in order that water at a desired temperature may be periodically sprayed onto the growing sprouts in order to maintain the moisture and temperature conditions needed for rapid growth. The cabinet may be provided with auxiliary thermostatically controlled heating or cooling means in order to maintain the cabinet interior at a prescribed temperature. In the above-noted apparatus, the beans to be sprouted are typically placed on perforated plates above the bottom of the growth bins. After germination, the sprouts grow rapidly and the expanding mass of sprouts, after about a three-day interval, fills the bin, which is then emptied and restocked with a fresh supply of beans. By properly rotating the bins in sequence, provision is made for a new supply of sprouts each day.

While the above arrangement has been widely used for a number of years to supply various commercial establishments, a number of problems have been noted. The above process tends to produce rather long, thin and tangled (curly) sprouts. Since bean sprouts are commonly used in "stir-fry" type cooking there is a tendency for these sprouts to become entangled with both themselves and the other vegetables being cooked. The sprouts may also have a tendency to produce a substantial amount of fine root hairs during growth. These root hairs are objectionable and down-grade the quality of the sprouts.

Shorter and stouter, thicker and straighter sprouts have been desired for some time. In addition to reducing problems of tangling, such sprouts are considered to be superior in taste, i.e., they are somewhat sweeter and crisper than the longer, thin, curly sprouts typically produced by the prior art apparatus described above. The problem is that the equipment and methods available to date have not been able to produce these desirable sprouts consistently and in the quantities necessary for a commercial operation.

SUMMARY OF THE INVENTION

Accordingly, the invention in one aspect provides an apparatus for the growing of sprouts comprising: a variable volume expandable chamber for containing a mass of the growing sprouts; and a means for restraining expansion of the chamber as the sprouts grow and expand to thereby cause compressive forces to develop in the mass of growing sprouts to promote generally thick, short sprout growth.

In a further aspect the apparatus includes means for fully immersing the compressed sprouts periodically for selected intervals of time in water to supply moisture to the sprouts and prevent overheating of same.

In a further aspect the invention provides an apparatus for the growing of sprouts, especially bean sprouts, comprising: a chamber in which seeds, especially beans, to be sprouted are placed; means for supplying liquid into said chamber in such manner as to promote germination of the seeds and growth of a mass of sprouts; said chamber including a movable wall arrayed such that as the growing mass of sprouts presses outwardly on said movable wall, the latter moves outwardly to accommodate the increasing volume of the mass of sprouts; and means restraining the outward movement of said wall so that the mass of sprouts is maintained under compression during growth to promote the formation of generally thick, short sprouts.

In a preferred form of the invention said chamber comprises an open topped bin and said movable wall comprises a plate adapted to overlie the sprout mass in the bin when in use, and friction means allowing movement of said plate only after application of a predetermined total force thereto by the mass of sprouts.

Still further according to the invention said means for supplying liquid to such chamber includes water supply means and drainage means arranged to periodically fully immerse the growing sprouts for a selected period of time at periodic intervals.

In a preferred embodiment of the invention, the apparatus includes a plurality of growth bays and a superimposed pair of said chambers in each bay, each of said chambers having an overflow therein with the overflow of the upper chamber leading to the lower chamber, a drain opening in each chamber with drainage from the upper chamber arranged to pass into the lower chamber, said liquid supply means adapted to supply water to the upper chamber sufficient to fill the upper chamber and then the lower chamber by overflow from the upper chamber, and the drain openings in said chambers being sized to release water therefrom at a rate to provide generally equal sprout immersion time in each chamber.

According to another aspect of the invention, there is provided the method of growing bean sprouts including the steps of: placing beans in a chamber under conditions of heat and moisture adapted to promote growth of sprouts so that a growing and expanding mass of bean sprouts is provided; and restraining the expansion of said mass of bean sprouts so that compression forces are developed in said mass for a period of time sufficient as to promote growth of generally thick, short sprouts.

As a further feature said restraining step is effected only after the beans have germinated.

Still further according to the method of the invention the mass of sprouts is periodically fully immersed in water of a selected temperature to supply moisture to the mass of sprouts and to prevent the overheating thereof.

A preferred embodiment of the invention will now be described by way of example, reference being made to the accompanying drawings.

DETAILED DESCRIPTION OF THE PREFERRED EMBODIMENT

Figure 1:
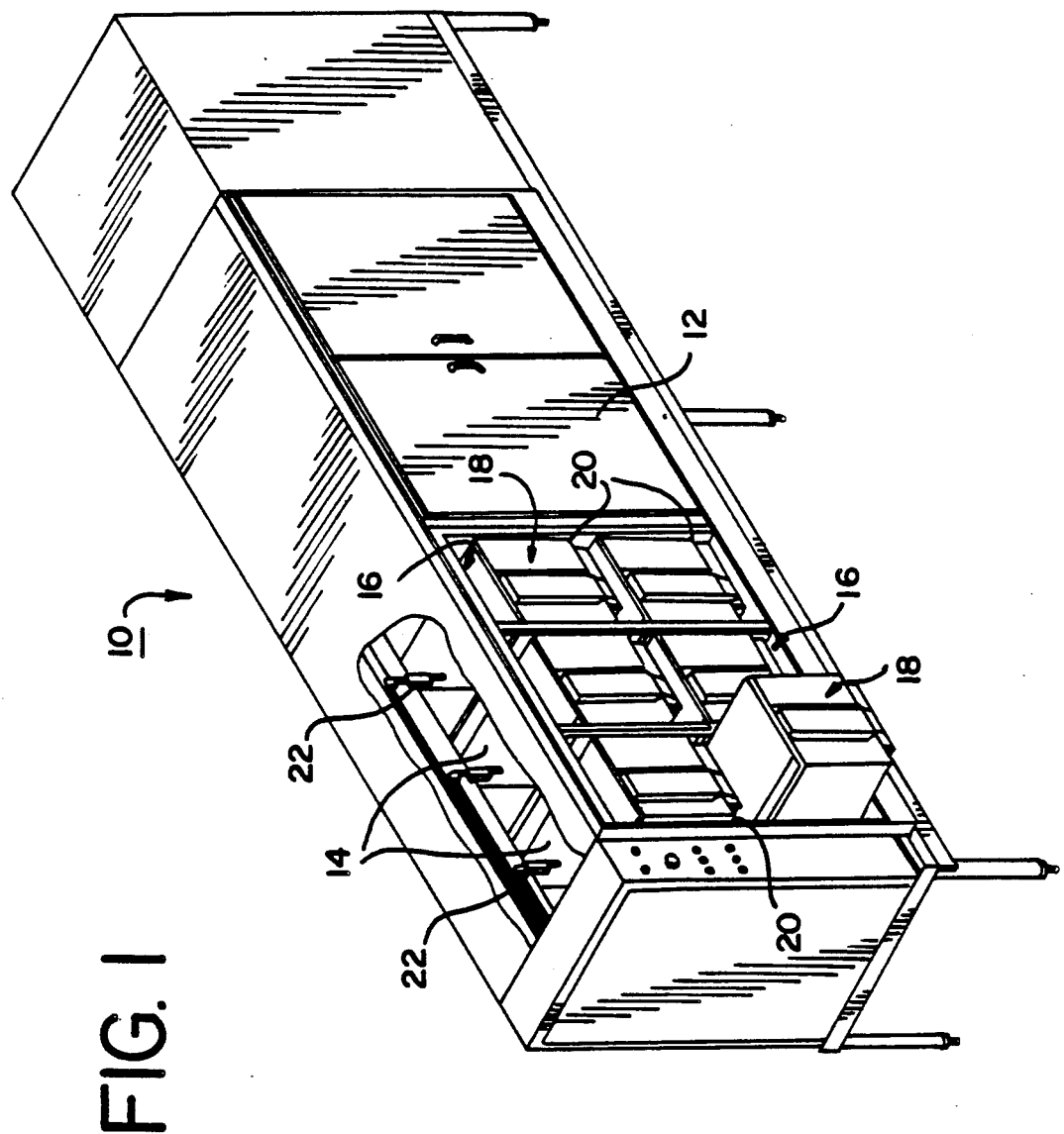
FIG. 1 is a perspective view of an apparatus for the intensive cultivation of bean sprouts.
Figure 2:
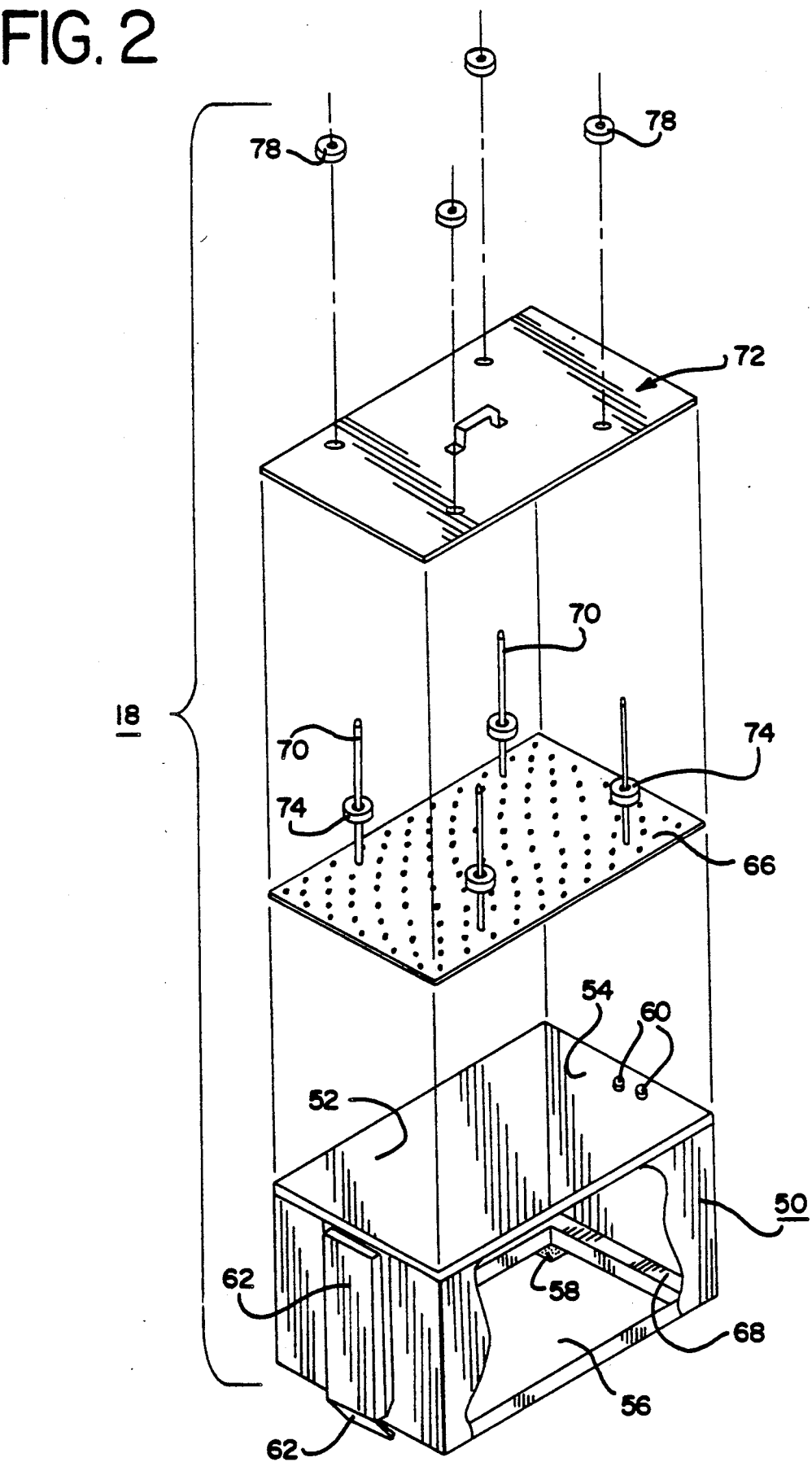
FIG. 2 is an exploded view of one of the bean sprout growth chambers for use in the apparatus of FIG. 1.

Referring to FIG. 1 there is shown a rectangular growth cabinet 10 having a roof, base, end and sidewalls provided with suitable thermal insulation material (not shown). Cabinet 10 is closed at the front by sliding doors 12. The cabinet has a series of spaced vertical interior walls 14 therein subdividing the cabinet interior into several bays 16, each of which bays 16 includes a superimposed pair of growth chambers 18 to be described in detail hereafter. The interior walls 14 are provided with suitable slideways 20, each supporting a respective growth chamber 18 in order that the latter may be readily slid endwise into or out of the cabinet 10. Although the cabinet model illustrated makes provision for six bays, only three bays need be considered since the cycle used will usually be a three-day cycle and the events occurring in the other three bays will duplicate the events in the first three bays. Smaller capacity models need only have three bays. The overall size of the apparatus, including the size of the growth chambers 18 is, of course, selected depending on capacity requirements.

The cabinet 10 may be provided with heating, cooling or ventilating units depending on environmental conditions to maintain internal cabinet temperatures in the general range of 70-75° F. The floor of the cabinet will contain drain outlets (not shown) for each bay 16 and connected to a suitable drain pipe.

Figure 6:
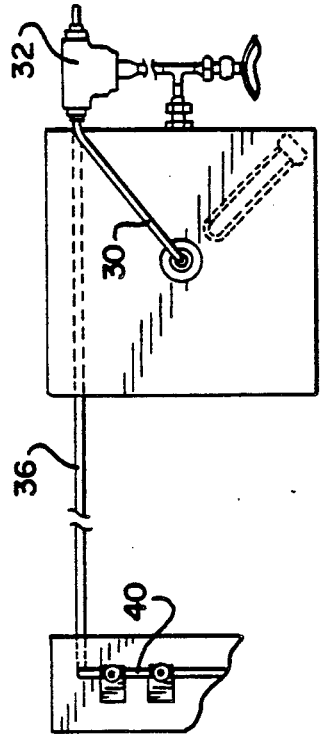
FIGS. 4, 5 and 6 are end, side and top views, respectively, of the water supply and control system.
Figure 5:
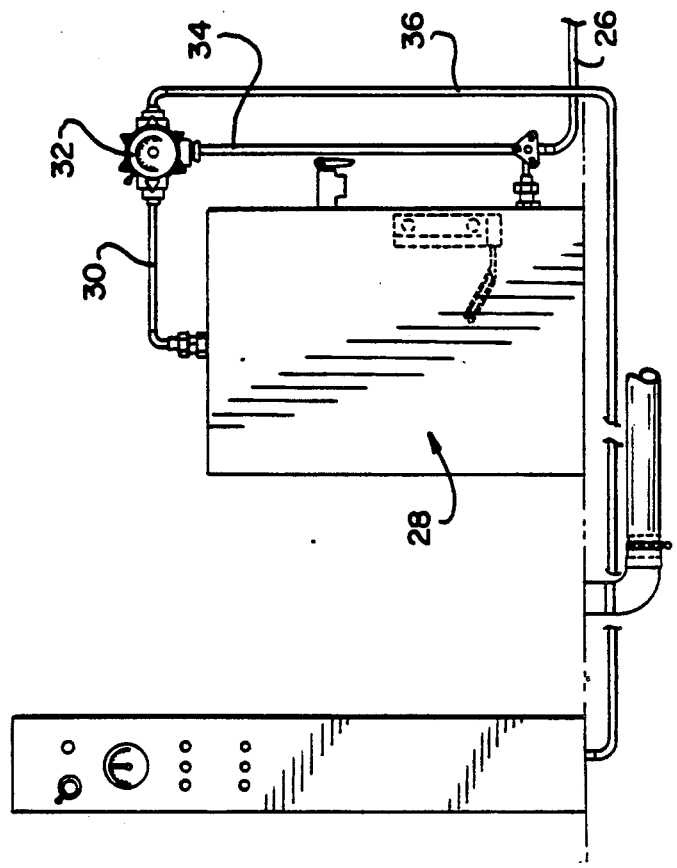
Figure 4:
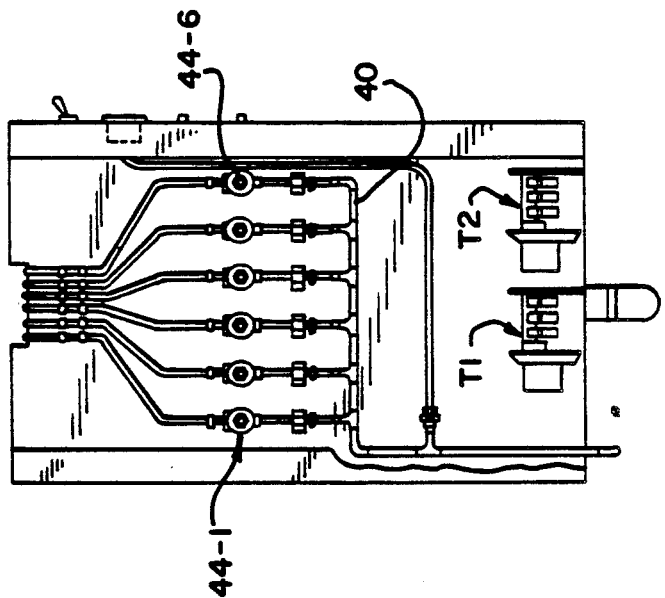
Figure 7:
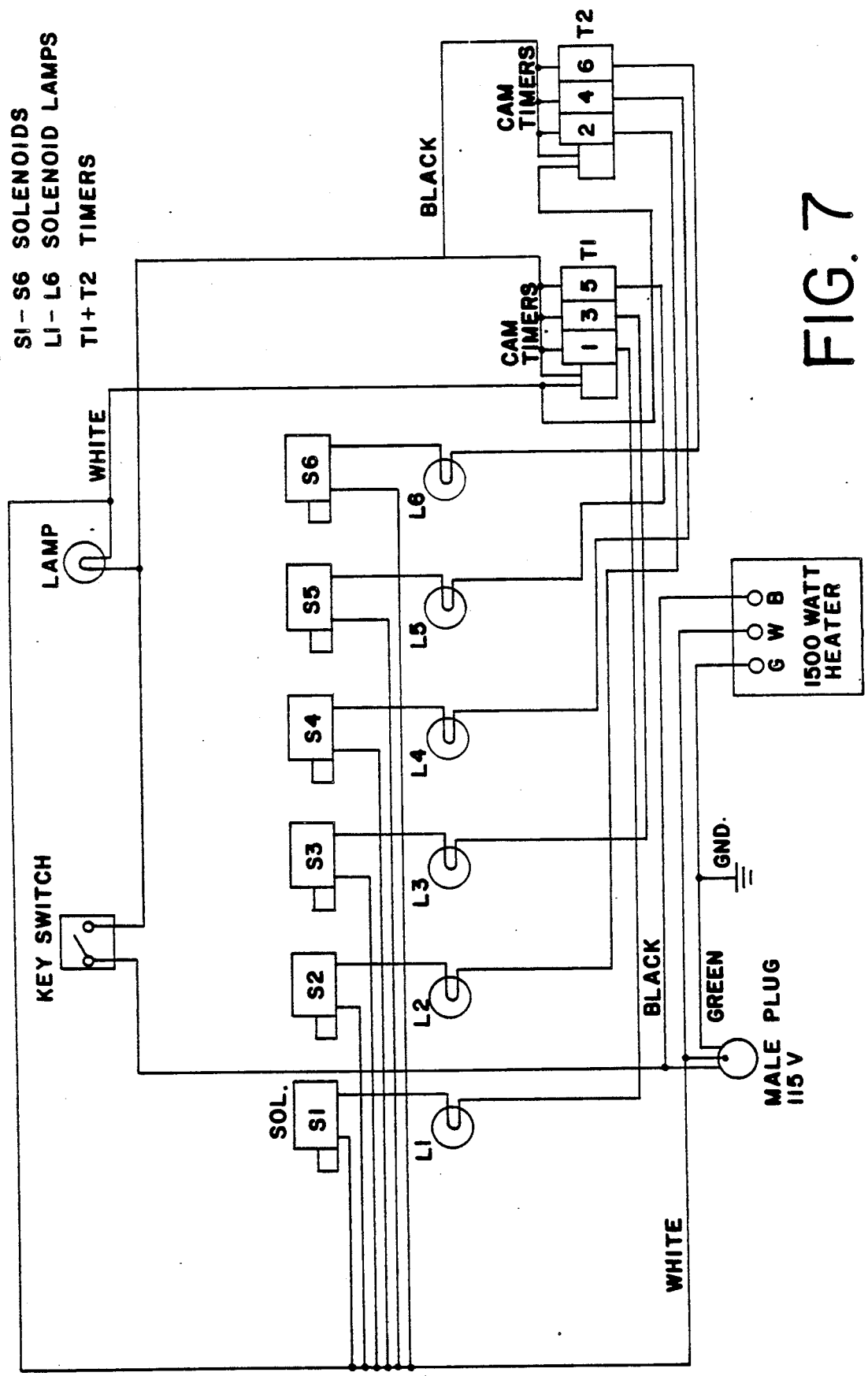
FIG. 7 is a schematic diagram of the electrical control system for the water supply solenoid valves.

Each bay 16 is also provided with an overhead water outlet nozzle 22, each nozzle being positioned to supply water into the uppermost of each of the pairs of chambers 18 in the respective bays. The water supply system is shown in FIGS. 4-6. As shown in FIG. 5, cold water from a source enters through pipe 26 into an electrical water heating tank 28. The hot water exits via pipe 30 which leads into a thermostatically controlled mixing and blending valve 32 as also does a cold water pipe 34 connected to the source. Water at the desired temperature exits the mixing valve 32 via pipe 36 and enters the manifold 40 shown in FIG. 4. A plurality of water lines 42, one for each nozzle 22, are connected to the manifold, each line having therein an associated solenoid valve 44-1 through 44-6. The solenoids S1-6 (FIG. 7) of the respective solenoid valves are actuated by cam times T1, T2 (FIGS. 4 and 7), the cams of which complete one rotation every three to six hours as required, thereby to open the solenoid valves 44-1 to 44-6 in the desired sequence thereby allowing for the periodic filling of the growth chambers 18 in the manner to be described more fully hereafter. Suitable indicator lights L1-L6 tell the operator when the valves 44-1 to 44-6 are open.

The growth chambers 18 each essentially include an open-topped metal box 50, preferably of stainless steel, having flat parallel side walls 52 and end walls 54 and a flat bottom 56. The bottom 56 is provided with a pair of screen covered openings 58 sized as described hereafter. The opposed end walls 54 are provided at their upper edges with overflow openings 60 and these communicate with opposed exterior guide channels 62 extending downwardly over these ends and terminating in inwardly inclined deflectors which ensure that the overflow from an upper one of the chambers 18 is directed into the lower chamber in the manner to be described hereafter.

The growth chamber 18 is provided with a perforated base plate 66 which rests on a perimeter ledge 68 about one inch above the bottom 56 of the chamber. This ensures that the beans do not lie in pools of water and cause root rot. The base plate 66 has four polished stainless steel rods 70 welded thereto and projecting upwardly at right angles to the base plate. These rods pass upwardly through corresponding apertures in a flat wall member or pressure plate 72, the pressure plate being sized to correspond with the interior dimensions of the chamber so that it fits in it fairly closely but is movable along the rods 70 without binding or jamming against the chamber walls.

The pressure plate 70, when fitted onto the guide rods, is prevented from coming into contact with the base plate 66 by means of stops 74 on the rods, which stops define a rest position for the plate 70 some two and one-half inches above the base plate. This spacing gives the bean sprouts a chance to germinate and start growing before any compressive pressure begins to develop on the sprouts.

In order to generate a substantial amount of frictional drag on the pressure plate as the bean sprouts grow and begin to push upwardly, each rod 70 is provided with a rubber grommet 78 which grips the rod 70 tightly and exerts considerable resistance to movement therealong. These friction grommets 78 are typically one inch rubber discs having a one-eighth inch diameter hole punched centrally therein so as to tightly grip the rods 70 (which are of one-quarter inch diameter). The amount of pressure generated is not particularly critical as the sprouts will thicken slightly under even a fairly small amount of compressive pressure during growth. However, for good results (e.g., up to a decrease in sprout length of thirty percent and up to a thirty percent increase in sprout diameter) pressures averaging roughly one-quarter pound per square inch of pressure plate surface area should be generated. Considering one model having a $5\frac{1}{2} \times 17$ inch pressure plate (93.5 square inches) the grommets 78 together should be able to withstand up to about 25 lbs. total force before allowing the plate to move thereby to provide the desired pressure loadings. If the grommets 78 slide too easily, more than one can be put on each rod.

Since the desired pressure loadings are generated by friction forces, the weight of the plate is of little importance in developing the required pressures. It would be possible to use a heavily weighted plate to provide pressure; however, this is not considered as advisable as using the friction means described above since the weight itself takes up more space. Furthermore, the sprout mass may not always expand uniformly and a weighted plate has a greater tendency to tip or skew around under non-uniform loadings.

In order to facilitate the placement of the friction grommets 78 on the rods 70, the upper ends of rods 70 should be smoothly rounded and somewhat pointed. In addition, the rods should terminate close to the top of the chamber so that when the pressure plate has been lifted fully up by the sprouts at the end of the growth cycle, the grommets 78 will be lifted clear of the ends of the rods 70 and can be simply lifted off the top of the pressure plate 72.

Figure 3A:
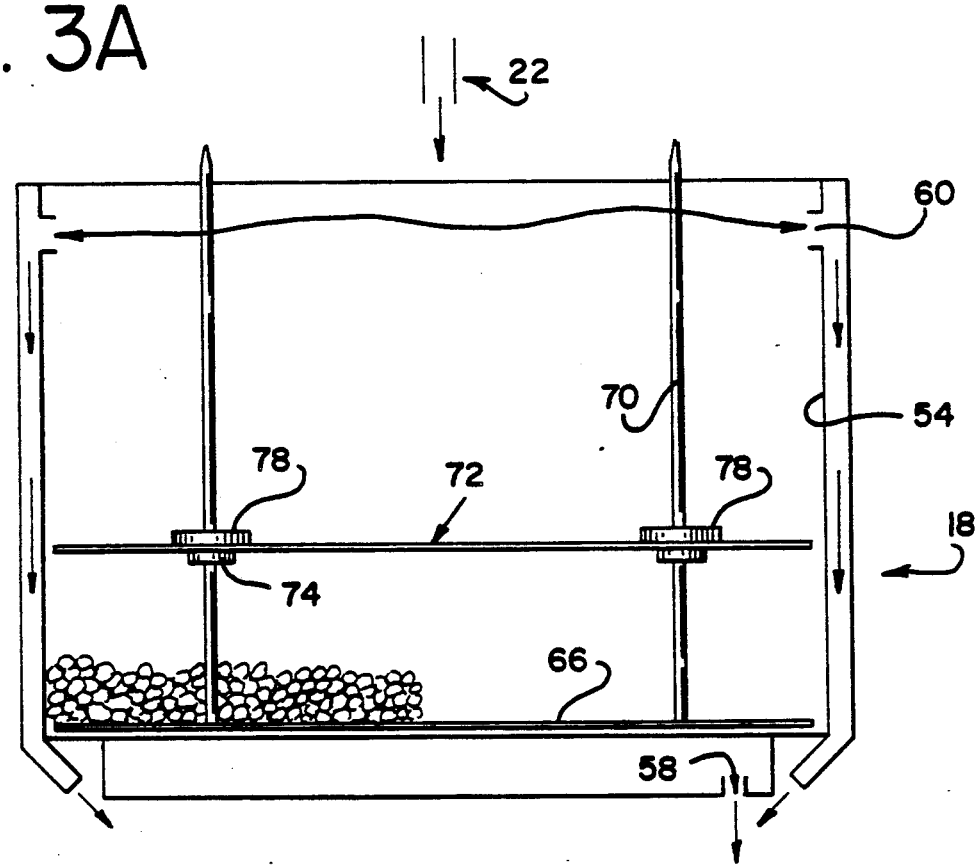
FIGS. 3a and 3b are vertical section views taken through a pair of the growth chambers showing the pressure plate arrangement and water overflow and drainage means.
Figure 3B:
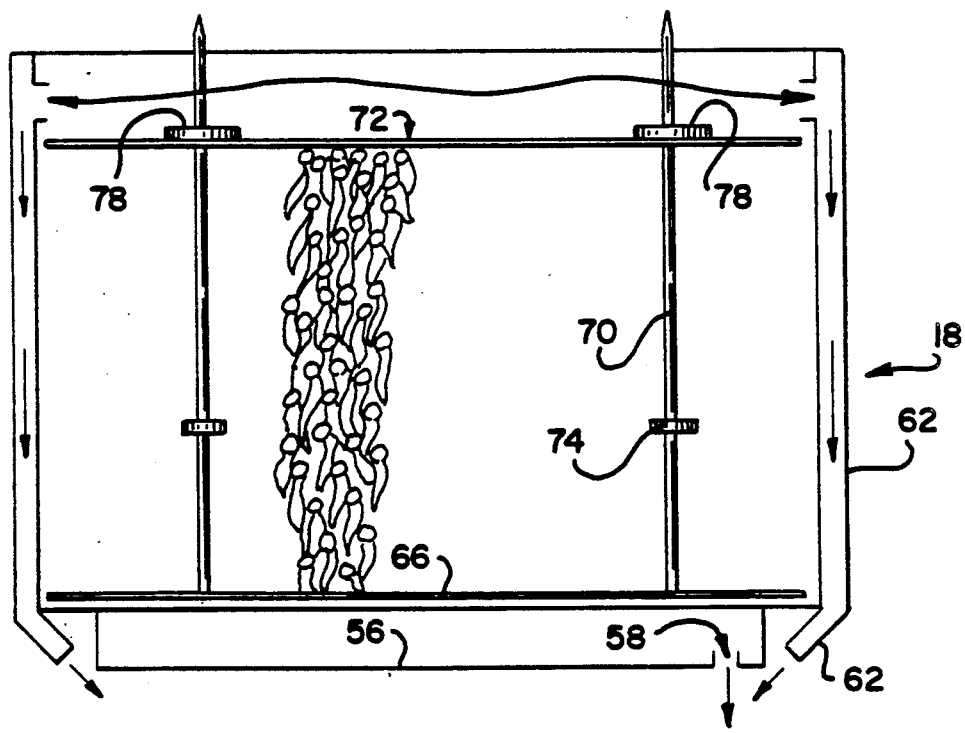

Referring to FIG. 3, a pair of superimposed growth chambers 18 are shown in the relative positions they occupy when located in a bay of the cabinet 10. Although the stage of sprout growth will be about the same in both chambers at any one point in time, FIG. 3, for purposes of illustration only, shows the upper chamber as having a fresh supply of beans therein, resting on the perforated bottom plate 66, while the lower chamber 18 shows the chamber near the end of the sprout growth cycle, i.e., with the mass of sprouts almost filling the chamber and with the pressure plate 72 near the upper end of its path of travel along the rods 70.

In operation, a fresh supply of beans of a type known to produce palatable sprouts, especially the well known "mung" variety, are positioned on the perforated base plates of the two chambers. The pressure plate 72 is then lowered downwardly along the rods 70 until it rests on the stops 74 in spaced relation to the beans and the rubber friction grommets 78 are then fitted onto the rods 70 and positioned on the pressure plate 72 as shown. The doors to the cabinet 10 are then closed and the water immersion cycle is then started.

The solenoid associated with the particular water outlet nozzle 22 operates to allow the warm water (75-82° F.) to pass into the top chamber 18. The rate of flow should be such that the top one fills in about three and one-half minutes following which the water overflows, passing out the overflow holes 60 and down the guide channels 62 and thence into the lower chamber thereby filling same in about the same space of time. The water is then shut off (total elapsed time of water flow about seven minutes) with the result that the water from the top chamber slowly drains out through its bottom drain hole 58 while the lower chamber also drains through its drain hole 58. Since both these holes 58 are the same size, the lower chamber 18 will not begin to empty until the top one is empty. By properly sizing these drain holes in relation to chamber volume, the desired total immersion time for the beans can be obtained. A time span of not more than thirty minutes is required since immersion for a longer time will starve the sprouts of oxygen and cause rotting. An overly short immersion time will not provide the moisture needed for rapid growth and the sprouts may also overheat and begin to rot; hence the drain holes are preferably sized to fully drain both tubs in about twenty minutes.

In general, the above water application flooding sequence is effected every three to six hours depending somewhat on the size of the growth chambers. The smaller the unit, the more frequent the watering. For a three-bay, 15 lb/day unit, watering on a four-hour cycle is recommended. For a three-bay machine on a four-hour cycle, there is a watering event every one and one-half hours as the chambers in the three bays are watered in sequence, i.e., each bay is watered six times in a twenty-four hour day. A typical three-day growth cycle in a three-bay machine would involve the following:

| BAY 1 | BAY 2 | BAY 3 |
| --- | --- | --- |
| Sunday "plant" beans | Monday "plant" beans | Tuesday "plant" beans |
| Wednesday remove sprouts and replant | Thursday remove sprouts and replant | Friday remove sprouts and replant |

The above-described pressurizing concept for producing thicker and shorter sprouts is closely tied to the above water immersion procedure. If one merely sprayed the sprouts as compressed beneath the pressure plate, the sprouts would not get enough moisture to develop properly and insufficient heat would be transferred away thus giving rise to overheating and spoilage. In many cases it may be desirable to periodically check the temperature of the sprout mass to avoid overheating and if overheating is detected, more frequent watering is needed. If the water supply is relatively warm, e.g., over 80° F., the cooling effect is lessened and more frequent watering may again be needed.

At the end of a typical three-day growth cycle, the compressed masses of bean sprouts will essentially fill the chambers 18. The pressure plates 72 are removed and the chambers overturned to remove the mass or block of bean sprouts (along with bottom plate 66 and rods 70) from each chamber. Since the sprouts are thicker and shorter than sprouts prepared in the conventional way, they do not entangle with each other to the same degree as before and may be separated fairly easily without substantial breakage. The pressure plate appears to have the further effect of avoiding turbulence in the water as it is applied to the sprouts thus avoiding tangling and curling problems to a substantial extent. The pressure plate also reduces the amount of light and oxygen reaching the top sprouts thus reducing the number of red cotyledons and green leaves produced. Furthermore, the flooding or immersion technique described satisfies the need for moisture to such an extent that the sprouts do not "look" for moisture to the same extent as hitherto and thus the root hair growth is minimal thus improving the quality of the sprouts appreciably. By periodically flooding the beans, the beans do not need to be pre-germinated before placement into the growth chamber thus saving time and costs.

Another advantage of the above-described tub overflow and drainage system is that the mechanisms involved are very simple; no complex valving and control systems are required and equipment costs are kept to relatively low levels.

Various means may be employed to enhance growth and quality. Temperature and humidity within the cabinet 10 should of course be controlled, especially if the cabinet is located in an area of extreme temperature conditions. Ultraviolet light may be used to retard bacterial growth.

While the preferred embodiment of the invention has been disclosed, it is understood that the invention is not limited to the disclosed example. Modifications in addition to those discussed can be made without departing from the invention. The scope of the invention is indicated in the appended claims, and all changes that come within the meaning and range of equivalency of the claims are therefore intended to be embraced therein.

We claim:

1. Apparatus for the growing of sprouts, especially bean sprouts, comprising:
   (a) a chamber in which seeds to be sprouted are placed;
   (b) a system for supplying liquid into said chamber in such a manner as to promote germination of the seeds and growth of a mass of sprouts;
   (c) said chamber including a wall mounted for vertical movement on a plurality of rods whereby as the growing mass of sprouts presses outwardly on said movable wall, the latter moves upwardly to accommodate the increasing volume of the mass of sprouts; and (d) a friction element on each of at least two of said rods and effective to restrain the outward movement of said wall so that the mass of sprouts is maintained under compression during growth to promote the formation of generally thick, short sprouts.

2. Apparatus as in claim 1 wherein said chamber comprises an open-topped box and said movable wall comprises a plate adapted to overlie the sprout mass in the box when in use, said friction elements comprising rubber-like grommets and allowing movement of said plate only after application of a predetermined total force thereto by the mass of sprouts.

3. Apparatus as in claim 1 wherein said means for supplying liquid to said chamber includes water supply means and drainage means arranged to fully immerse the growing sprouts for a selected period of time at periodic intervals.

4. Apparatus as in claims 1 including a plurality of growth bays and a superimposed pair of said chambers in each bay, each of said chambers having an overflow therein with the overflow of the upper chamber leading to the lower chamber, a drain opening in each chamber with drainage from the upper chamber arranged to pass into the lower chamber, said liquid supply means adapted to supply water to the upper chamber sufficient to fill the upper chamber and then the lower chamber by overflow from the upper chamber, and the drain openings in said chambers being sized to release water therefrom at a rate to provide generally equal sprout immersion time in each chamber.

* * * * *